(12) United States Patent
Leijon et al.

(10) Patent No.: US 7,088,027 B2
(45) Date of Patent: Aug. 8, 2006

(54) ROTATING ASYNCHRONOUS CONVERTER AND A GENERATOR DEVICE

(75) Inventors: Mats Leijon, Västerås (SE); Thorsten Schütte, Västerås (SE); Christian Sasse, Västerås (SE); Udo Fromm, Västerås (SE)

(73) Assignee: ABB AB, Vasteras (SE)

( * ) Notice: Subject to any disclaimer, the term of this patent is extended or adjusted under 35 U.S.C. 154(b) by 46 days.

(21) Appl. No.: 11/050,858

(22) Filed: Feb. 7, 2005

(65) Prior Publication Data
US 2005/0127773 A1   Jun. 16, 2005

Related U.S. Application Data

(63) Continuation of application No. 08/973,306, filed as application No. PCT/SE97/00890 on May 27, 1997, now Pat. No. 6,906,447.

(30) Foreign Application Priority Data
May 29, 1996   (SE) ..................... 9602079

(51) Int. Cl.
*H02K 3/40* (2006.01)
*H02K 3/32* (2006.01)
*H02K 47/18* (2006.01)

(52) U.S. Cl. ............... 310/196; 310/208; 310/184; 174/DIG. 20; 174/DIG. 22; 174/DIG. 28; 290/5; 290/6; 363/174

(58) Field of Classification Search ........ 310/179–180, 310/184, 195–196, 198–208, 112, 213; 363/150, 363/8, 102–105; 323/201; 307/73, 76, 82; 290/1 R, 5, 6, 8; 174/DIG. 13–33; 148/269
See application file for complete search history.

(56) References Cited

U.S. PATENT DOCUMENTS

| | | | | | |
|---|---|---|---|---|---|
| 1,673,673 | A | * | 6/1928 | Girault | ............... 307/24 |
| 1,894,084 | A | * | 1/1933 | Chase | ............... 363/150 |
| 3,275,838 | A | * | 9/1966 | Almstrom | ............... 307/82 |
| 3,975,646 | A | * | 8/1976 | Kilgore et al. | ............... 307/21 |

(Continued)

FOREIGN PATENT DOCUMENTS

EP          503817 A1 *   9/1992

OTHER PUBLICATIONS

Ghoneem, G.A., "Performance Characteristics of a Wide Range Induction Type Frequency Converter", IEEMA Journal, vol. 125, No. 9, pp. 21-34, Sep. 1995.*

*Primary Examiner*—Burton Mullins
(74) *Attorney, Agent, or Firm*—Dykema Gossett PLLC

(57) ABSTRACT

The present invention relates to a rotating asynchronous converter and a generator device. The converter comprises a first stator connected to a first AC network with a first frequency $f_1$, and a second stator connected to a second AC network with a second frequency $f_2$. The converter also comprises a rotor means which rotates in dependence of the first and second frequencies $f_1$, $f_2$. The stators each comprises at least one winding, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation.

10 Claims, 3 Drawing Sheets

U.S. PATENT DOCUMENTS

| | | | |
|---|---|---|---|
| 4,039,922 A * | 8/1977 | Chirgwin | 363/9 |
| 4,228,391 A * | 10/1980 | Owen | 322/35 |
| 4,503,377 A * | 3/1985 | Kitabayashi et al. | 318/807 |
| 4,517,471 A * | 5/1985 | Sachs | 307/67 |
| 4,701,691 A * | 10/1987 | Nickoladze | 322/32 |
| 4,853,565 A * | 8/1989 | Elton et al. | 310/45 |
| 6,456,021 B1 | 9/2002 | McLaren et al. | |
| 6,906,447 B1 * | 6/2005 | Leijon et al. | 310/196 |

* cited by examiner

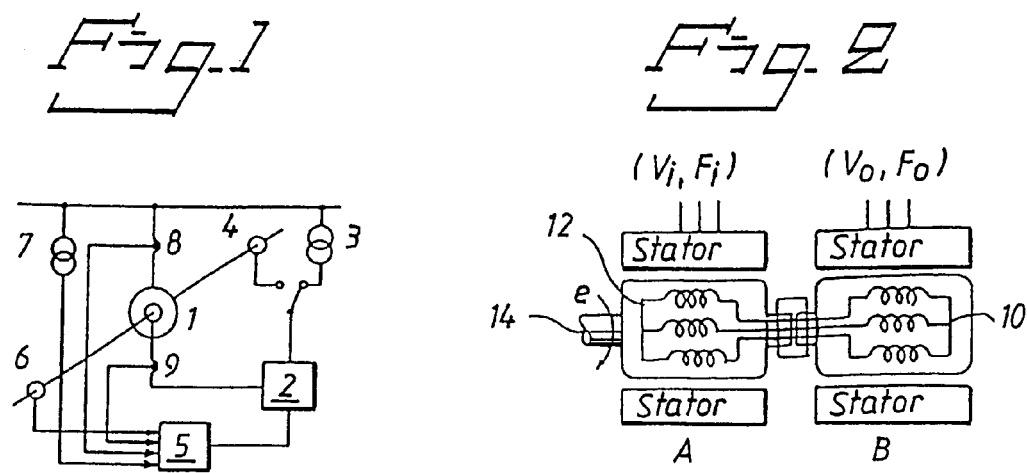
Fig. 1
Fig. 2
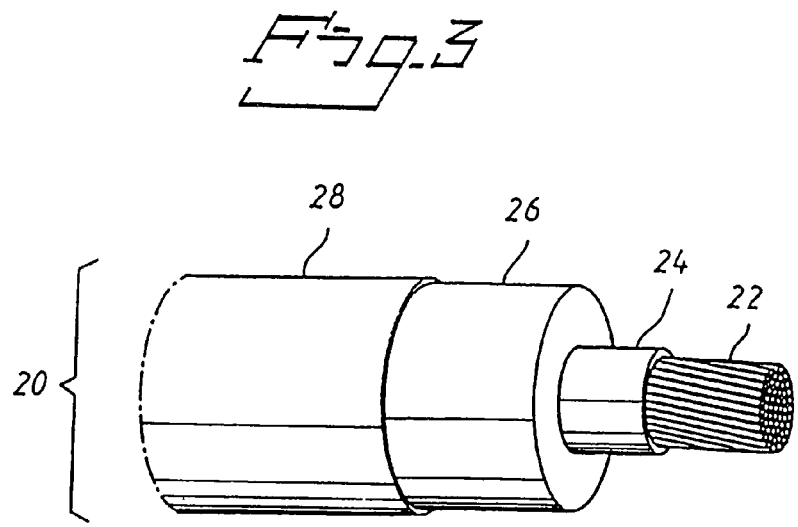
Fig. 3

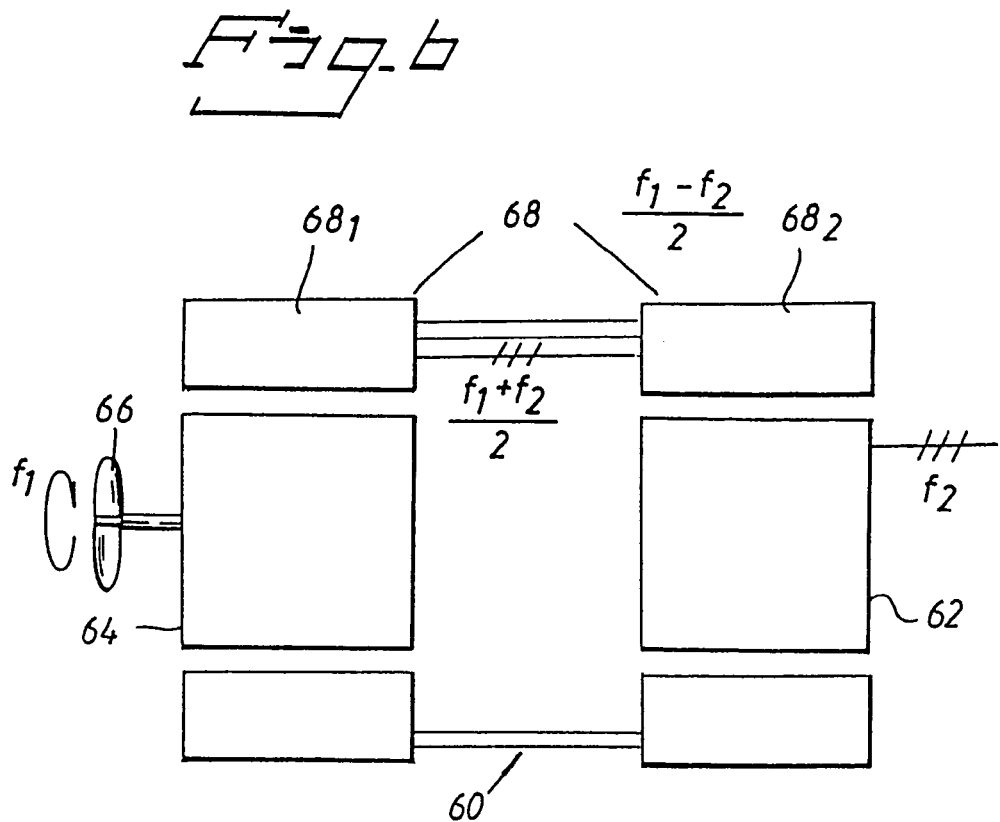
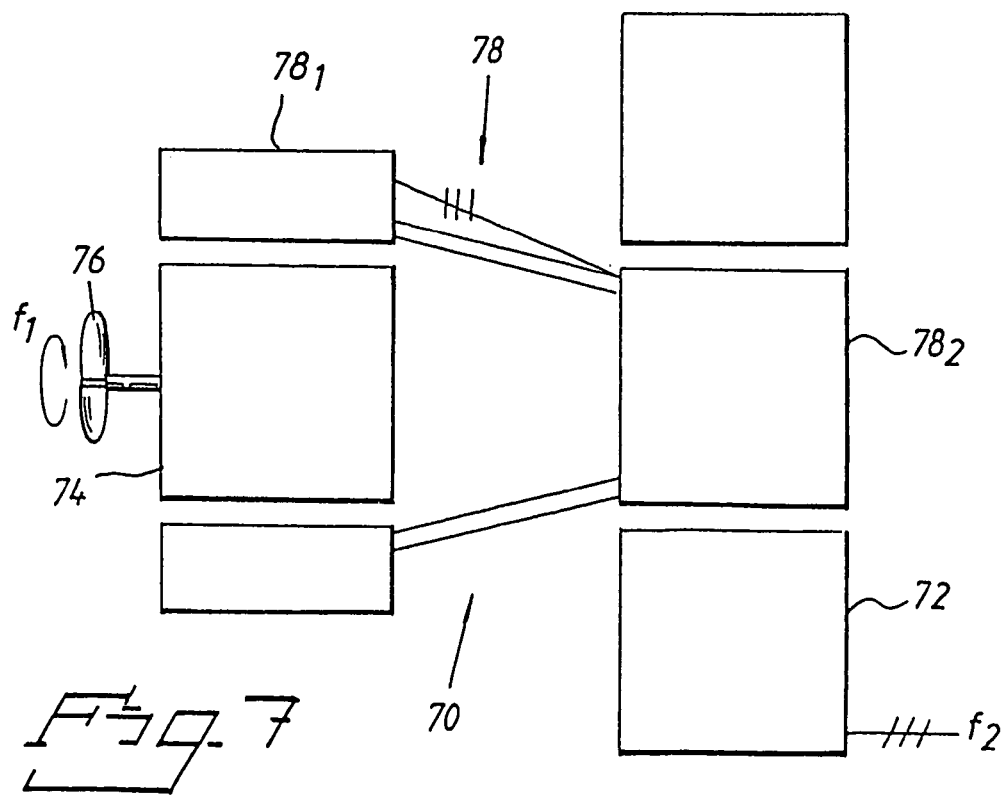

US 7,088,027 B2

ROTATING ASYNCHRONOUS CONVERTER AND A GENERATOR DEVICE

CROSS-REFERENCE TO RELATED APPLICATION

This application is a continuation of application Ser. No. 08/973,306, filed Apr. 10, 1998 now U.S. Pat. No. 6,906, 447, which is a 371 of PCT/SE97/00890, filed May 27, 1997.

TECHNICAL FIELD OF THE INVENTION

The present invention relates to a rotating asynchronous converter and the use of such converter.

The present invention also relates to a generator device.

BACKGROUND OF THE INVENTION

In a number of situations exchange of power must be performed between AC networks with different or at least not synchronous frequencies. The most frequent cases are the following:
1. Connection of not synchronous three phase networks with equal rating frequencies, e.g. between eastern and western Europe.
2. Connection of three phase networks with different frequencies, most usually 50 Hz/60 Hz (e.g. Japan, Latin America).
3. Connection of a three phase network and a low frequency, one/two phase network for railway supply, in Europe 50 Hz/16.2/3 Hz, in USA 60 Hz/25 Hz.
4. The use of rotating asynchronous converters as a series compensation in long distance AC transmission.

Today, the connection is performed with the aid of power electronics and DC intermediate link. In the above mentioned cases 2 and 3 the connection can further be performed with the aid of matrix converters. In case of synchronous, but different frequencies in the above mentioned cases 2 and 3 the connection can further be performed with the aid of rotating converters comprising mechanically connected synchronous machines.

In the article, "Investigation and use of asynchronized machines in power systems", Electric Technology USSR, No. 4, pp. 90–99, 1985, by N. I. Blotskii, there is disclosed an asynchronized machine used for interconnection of power systems, or their parts, which have different rated frequencies, or the same rated frequencies, but differing in the degree of accuracy with which it must be maintained. The structure of the asynchronized machine is disclosed in FIG. 1. The asynchronized machine includes an electric machine 1 which is a machine with a conventional three-phase stator and either a non-salient-pole symmetrical rotor or a salient-pole or non-salient-pole electrically asymmetrical rotor, the phase leads being connected to slip rings; an exciter 2 which is a cycloconverter or reversing controlled rectifier, the cycloconverter supply 3 or 4, a regulator 5 forming the control law required for the rotor ring voltages and the main machine rotor angle and speed 6, voltage 7 and current 9 sensors of the stator and rotor.

In the article, "Performance Characteristics of a Wide Range Induction type Frequency Converter", IEEMA Journal, Vol. 125, No. 9, pp. 21–34, September 1995, by G. A. Ghoneem, there is disclosed an induction-type frequency converter as a variable frequency source for speed control drives of induction motors. In FIG. 2 there is disclosed a schematic diagram of the induction-type frequency converter. The induction-type frequency converter consists of two mechanically and electrically coupled wound rotor induction machines A, B. The stator windings of one of them (A) are connected to 3-phase supply a t line frequency (Vi, Fi), while the stator windings of the other machine (B) represent the variable frequency output (Vo, Fo). The rotor windings 10, 12 of the two machines are connected together with special arrangement. The converter is driven by a variable Speed primemover 14, a DC motor can be used.

Static converters have drawbacks such as relatively low efficiency (ca 95%) owing to the losses in the semi-conductors, harmonics which have to be compensated with the aid of filters. The use of DC intermediate links leads to the use of special converter transformers with very complex design. The fillers are leading to a great need of space for the total assembly. Conventional rotating converters are not designed for high voltages, so a transformer is needed at each side for the connection to the AC network. The efficiency then becomes comparable to or even lower than the efficiency of a static converter.

SUMMARY OF THE INVENTION

The object of the invention is to solve the above mentioned problems and to provide a rotating asynchronous converter for connection of AC networks with equal or different frequencies. This object is achieved by providing a rotating asynchronous converter defined in the introductory part of claim 1, 10, or 19 with the advantageous features of the characterizing part of said claims.

Accordingly, the converter comprises a first stator connected to a first AC network with a first frequency $f_1$, and a second stator connected to a second AC network with a second frequency $f_2$. The converter also comprises a rotor means which rotates in dependence of the first and second frequencies $f_1$, $f_2$. At least one of the stators each comprise at least one winding, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation.

According to another embodiment of the converter, it comprises a first stator connected to a first AC network with a first frequency $f_1$, and a second stator connected to a second AC network with a second frequency $f_2$. The converter also comprises a rotor means which rotates in dependence of said fist and second frequencies $f_1$, $f_2$. The stators each comprise at least one winding, wherein each winding comprises a cable comprising at least one current-carrying conductor, each conductor comprises a number of strands, around said conductor is arranged an inner semiconducting layer, around said inner semiconducting layer is arranged an insulating layer of solid insulation, and around said insulating layer is arranged an outer semi-conductor layer.

According to another embodiment of the converter, it comprises a first stator connected to a first AC network with a first frequency $f_1$, and a second stator connected to a second AC network with a second frequency $f_2$. The converter also comprises a rotor means which rotates in dependence of said first and second frequencies $f_1$, $f_2$. The stators each comprises at least one winding, wherein each winding comprises at least one currect-carrying conductor. Each winding also comprises an insulation system, which in respect of its thermal and electrical properties permits a voltage level in said rotating asynchronous converter exceeding 36 kV.

A very important advantage of the present invention as defined in claim 1, 10, or 19, is that it is possible to achieve a connection of two not synchronous networks without the further use of transformers or any other equipment. Another advantage is the high efficiency, which is expected to be 99%.

By designing the insulation system, which suitably is solid, so that it in thermal and electrical view is dimensioned for voltages exceeding 36 kV, the system can be connected to high voltage power networks without the use of intermediate step-down-transformers, whereby is achieved the above referenced advantages. Such a system is preferably, but not necessarily, designed in such a way that it comprises the features of the rotating asynchronous converter according to any one of claims 1–19.

Another object of the invention is to solve the above mentioned problems and to provide a generator device with variable rotational speed. This object is achieved by providing a generator device deined in the introductory part of claim 20 or 29 with the advantageous features of the characterising parts of said claims.

Accordingly, the generator device comprises a stator connected to an AC network with a frequency $f_2$, a first cylindrical rotor connected to a turbine, which rotates with a frequency $f_1$. The generator device also comprises a rotor means which rotates in dependence of the frequencies $f_1$, $f_2$. The stator and the first cylindrical rotor each comprises at least one winding, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation.

According to another embodiment of the generator device, it comprises a stator connected to an AC network with a frequency $f_2$, and a first cylindrical rotor connected to a turbine, which rotates with a frequency $f_1$. The generator device also comprises a rotor means which rotates in dependence of the frequencies $f_1$, $f_2$. The stator and the first cylindrical rotor each comprises at least one winding, wherein each winding comprises a cable comprising at least one current-carrying conductor, each conductor comprises a number of strands, around said conductor is arranged an inner semiconducting layer, around said inner semiconducting layer is arranged an insulating layer of solid insulation, and around said insulating layer is arranged an outer semiconducting layer.

The above mentioned and other preferable embodiments of the present invention are specified in the dependent claims.

In a certain aspect of the present invention it relates to the use of the invented asynchronous converter in specific applications such as those specified in claims 38–41, in which applications the advantages of the invented device are particularly prominent.

Embodiments of the invention will now be described with a reference to the accompanying drawings, in which:

BRIEF DESCRIPTION OF THE DRAWINGS

FIG. 1 shows a schematic diagram of an asynchronized machine used for interconnection of power system according to the state of the art;

FIG. 2 shows a schematic diagram of an induction-type frequency converter as a variable frequency source according to the state of the art;

FIG. 3 shows the parts included in the current modified standard cable;

FIG. 6 shows a first embodiment of a generator device according to the present invention; and FIG. 7 shows a second embodiment of the generator device according to the present invention.

DETAILED DESCRIPTION OF EMBODIMENTS

Figure 4:
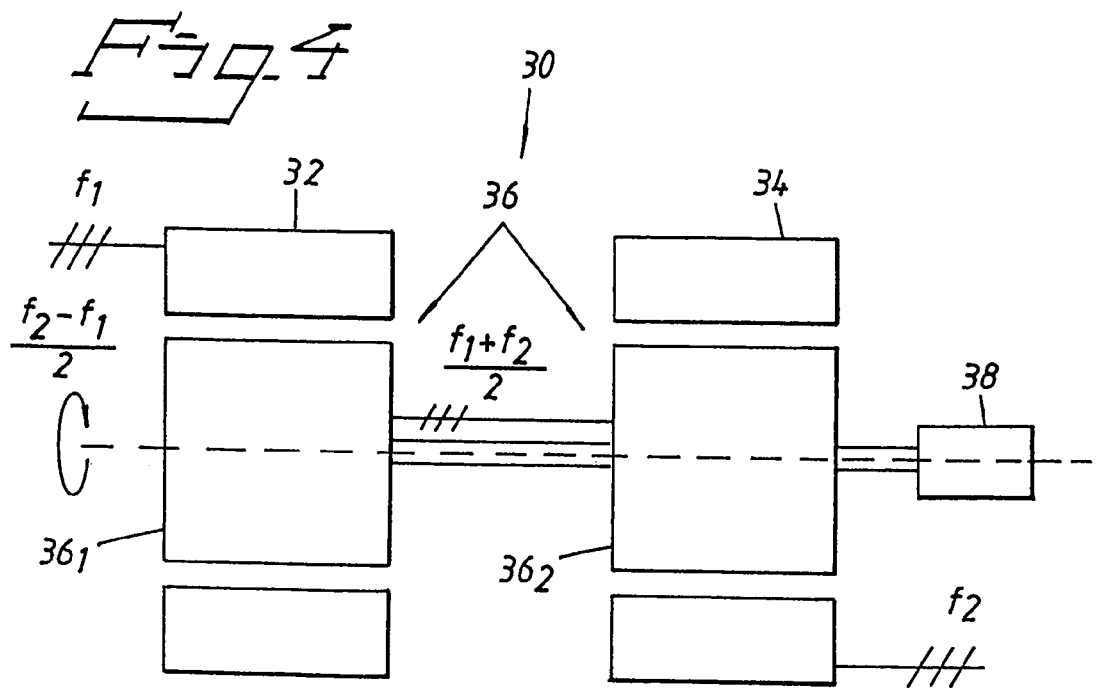
FIG. 4 shows a first embodiment of a rotating asynchronous converter according to the present invention.

A preferred embodiment of the improved cable is shown in FIG. 3. The cable 20 is described in the figure as comprising a current-carrying conductor 22 which comprises transposed both non-insulated and insulated strands. Electromechanically transposed, extruded there is an inner semiconducting casing 24 which, in turn, is surrounded by an extruded insulation layer 26. This layer is surrounded by an external semiconducting layer 28. The cable used as a winding in the preferred embodiment has no metal shield and no external sheath.

Preferably, at least two of these layers, and most preferably all of them, has equal thermal expansion coefficients. Hereby is achieved the crucial advantage that in case of thermal motion in the winding, one avoids defects, cracks or the like.

FIG. 4 shows a first embodiment of a rotating asynchronous converter 30 according to the present invention. The rotating asynchronous converter 30 is used for connection of AC networks with equal or different frequencies. The converter 30 comprises a first stator 32 connected to a first AC network (not disclosed) with a first frequency $f_1$, and a second stator 34 connected to a second AC network (not disclosed) with a second frequency $f_2$. In the disclosed embodiment the stators 32, 34 are three phase stators 32, 34 comprising three windings each, wherein each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation. The windings can also be formed of a cable of the type disclosed in FIG. 3. The converter 30 also comprises a rotor means 36 which rotates in dependence of the first and second frequencies $f_1$, $f_2$. In the disclosed embodiment the rotor means 36 comprises two electrically and mechanically connected three phase rotors $36_1$, $36_2$, which are concentrically arranged in respect of said stators 32, 34. The converter 30 also comprises an auxiliary device 38 connected to said rotors $36_1$, $36_2$ for starting up of the rotors $36_1$, $36_2$ to a suitable rotation speed before connection of said converter 30 to said AC networks. Each rotor $36_1$, $36_2$ comprises a low voltage winding (not disclosed). When the first stator 32 is connected to a three phase AC network with the frequency $f_1$ and the second stator 34 is connected to a three phase AC network with the frequency $f_2$, the rotors $36_1$, $36_2$ will rotate with the frequency $(f_1-f_2)/2$ and the stator current has the frequency $(f_1+f_2)/2$. The efficiency with such a converter will be very high (~99%) for small frequency differences due to the fact that all power is transmitted as in a transformer. Assuming $f_1 < f_2$, a proportion $$\frac{f_1 - f_2}{f_2}$$

of the power is transmitted mechanically and the remainder $$\frac{f_1}{f_2}$$

of the power is transmitted by transformer action. Mechanical power is only consumed to maintain the rotation.

Figure 5:
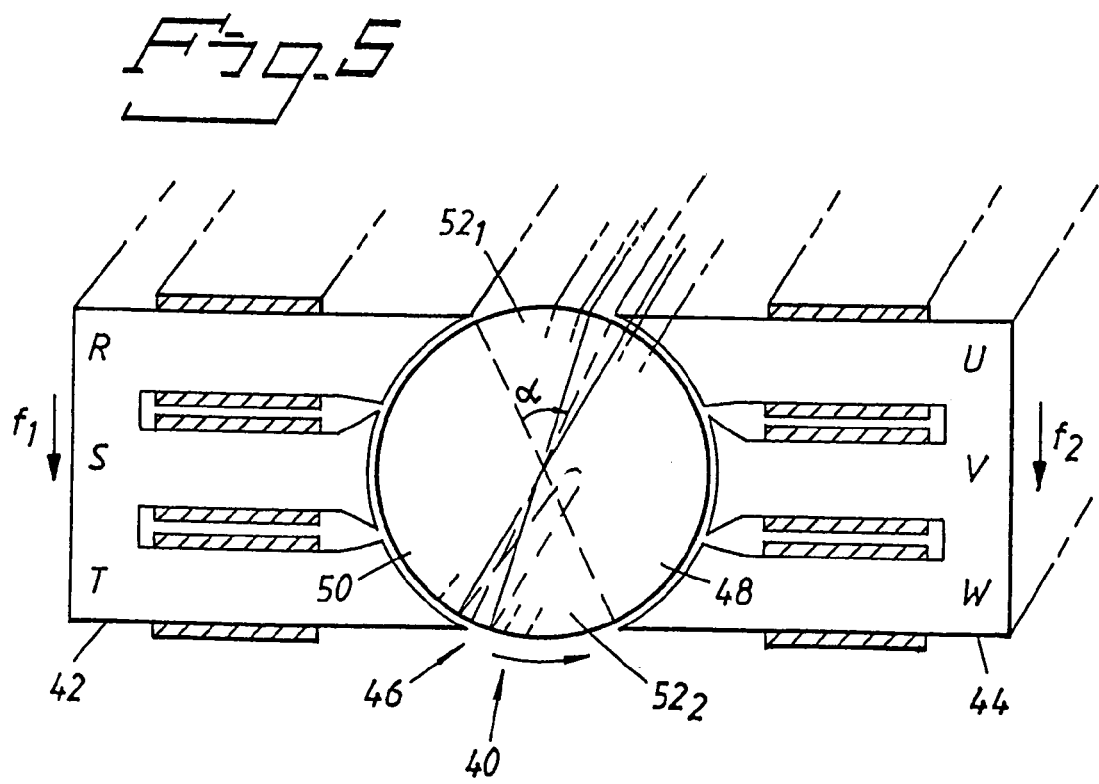
FIG. 5 shows a second embodiment of the rotating asynchronous converter according to the present invention.

In FIG. 5 there is disclosed a second embodiment of the rotating asynchronous converter 40 according to the present invention. The rotating asynchronous converter 40 is also used for connection of AC networks with equal or different frequencies. The converter 40 comprises a first stator 42 connected to a first AC network (not disclosed) with a first frequency $f_1$, and a second stator 44 connected to a second AC network (not disclosed) with a second frequency $f_2$. In the disclosed embodiment the stators 42, 44 are three phase stators 42, 44 comprising three windings each, wherein each winding can be of the type described in connection to FIG. 4. The converter 40 also comprises a rotor means 46 which rotates in dependence of the first and second frequencies $f_1$, $f_2$. In the disclosed embodiment the rotor means 46 comprises only one rotor 46 concentrically arranged in respect of said stators 42, 44. Said rotor 46 also comprises a first loop of wire 48 and a second loop of wire 50, wherein said loops of wire 48, 50 are connected to each other and are arranged opposite each other on said rotor 46. The loops of wire 48, 50 are also separated by two sectors $52_1$, $52_2$, wherein each sector $52_1$, $52_2$ has an angular width of $\alpha$. The converter 40 also comprises an auxiliary device (not disclosed) connected to said rotor 46 for starting up of the rotor 46 to a suitable rotational speed before connection of said converter 40 to said AC networks. To compensate for the frequency difference $\Delta f$, the rotor 46 only needs to rotate with the frequency $$f_R = \frac{\pi - \alpha}{\pi} \cdot \frac{\Delta f}{4},$$

wherein $\Delta f = |f_1 - f_2|$. For $\alpha = \pi/4$ this means $$f_R = \frac{3\Delta f}{16},$$

i.e. a very low rotational frequency. The main advantages with this embodiment are the low rotational frequency and the use of only one rotor.

In FIG. 6 there is disclosed a first embodiment of a generator device 60 with variable rotational speed according to the present invention. The generator device 60 comprises a stator 62 connected to an AC network (not disclosed) with a frequency $f_2$ and a first cylindrical rotor 64 connected to a turbine 66, which rotates with a frequency $f_1$. The generator device 60 comprises also a rotor means 68 which rotates in dependence of the frequencies $f_1$, $f_2$. The stator 62 and said first cylindrical rotor 64 each comprises at least one winding (not disclosed). Each winding comprises at least one current-carrying conductor, and each winding comprises an insulation system, which comprises on the one hand at least two semiconducting layers, wherein each layer constitutes substantially an equipotential surface, and on the other hand between them is arranged a solid insulation. Each winding can in another embodiment also comprise a cable of the type disclosed in FIG. 3. The rotor means 68 comprises two electrically and mechanically connected rotors $68_1$, $68_2$, which rotors $68_1$, $68_2$ are hollow and arranged concentrically around said stator 62 and said cylindrical rotor 64. The stator 62 in the disclosed embodiment has a cylindrical shape. The rotors $68_1$, $68_2$ each comprises a low voltage winding (not disclosed) and they are rotating with the frequency $(f_1-f_2)/2$ when said generator device is in operation. The frequency of the rotor current will be $(f_1+f_2)/2$ when the generator device 60 is in operation. This generator device 60 is now disconnected from the power frequency and can be operated with the frequency as an optimizeable parameter. This generator device 60 will also give a better efficiency and power matching than a conventional generator.

In FIG. 7 there is disclosed a second embodiment of the generator device 70 according to the present invention. The generator device 70 comprises a stator 72 connected to an AC network (not disclosed) with a frequency $f_2$ and a first cylindrical rotor 74 connected to a turbine 76, which rotates with a frequency $f_1$. The generator device 70 also comprises a rotor means 78 which rotates in dependence of the frequencies $f_1$, $f_2$. The stator 72 and said first cylindrical rotor 74 each comprises at least one winding (not disclosed). The winding can be of the types which were mentioned in the description in connection to FIG. 6. The rotor means 78 comprises a first rotor $78_1$ and a second rotor $78_2$, which rotors $78_1$, $78_2$ are electrically and mechanically connected to each other. The first rotor $78_1$ is hollow and arranged concentrically around said first cylindrical rotor 74 and said second rotor $78_2$ is cylindrical and surrounded by the stator 72. The first and second rotors $78_1$, $78_2$ of said rotor means 78 each comprises a low voltage winding and said rotors $78_1$, $78_2$ are rotating with the frequency $(f_1-f_2)/2$ when said generator device 70 is in operation. The stator 72 is hollow and arranged around said second rotor $78_2$. This generator device 70 works in the same way and has the same advantages as the generator device 60 disclosed in FIG. 6.

The disclosed embodiments only show connection of three phase networks, but the invention is also applicable for connection of a three phase network, wherein one stator has a one/two phase application. The invention can also be used for connection of a three phase network and a one/two phase network, wherein one stator having a three phase application is connected via a Scott-connection or another symmetrical connection to a one/two phase network. The invention is also applicable to more than two stators and rotor parts to connect more than two AC networks. The only condition is that only two not synchronous networks are connected.

The invention is not limited to the embodiments described in the foregoing. It will be obvious that many different modifications are possible within the scope of the following claims.

The invention claimed is:

1. A rotating asynchronous converter for connection of AC networks with equal or different frequencies, wherein the converter comprises a first stator connected to a first AC network with a first frequency $f_1$, and a second stator connected to a second AC network with a second frequency $f_2$, wherein the converter comprises a rotor which rotates in dependence of the first and second frequencies $f_1$, $f_2$, and wherein at least one of said stators comprises at least one winding, including at least one current-carrying conductor, and an insulating system including
- a first semiconducting layer surrounding the conductor and being in contact therewith;
- a solid insulation layer surrounding the first layer;
- a second semiconductor layer surrounding the insulating layer;
- said insulating system forming an equipotential surface surrounding the conductor, and wherein said first and second semiconducting layers and the solid insulation layer have substantially equal thermal expansion coefficients.

2. The rotating asynchronous converter according to claim 1, wherein the potential of the first semiconducting layer is substantially equal to the potential of the conductor.

3. The rotating asynchronous converter according to claim 1, wherein said second semiconducting layer is connected to a selected potential.

4. The rotating asynchronous converter according to claim 1, wherein said potential is ground potential.

5. The rotating asynchronous converter according to claim 1, wherein each of said inner and outer layers is attached to the adjacent layer of solid insulation along substantially the whole of a connecting surface therebetween.

6. The rotating asynchronous converter according to claim 1, wherein the winding comprises a high voltage cable.

7. The rotating asynchronous converter according to claim 1, wherein said rotor comprises a pair of concentrically arranged electrically and mechanically connected rotors.

8. The rotating asynchronous converter according to claim 1, wherein the rotor comprises a low voltage winding, and wherein said rotor is rotatable with the frequency $(f_1-f_2)/2$ and the stator has a current with a frequency $(f_1-f_2)/2$.

9. The rotating asynchronous converter according to claim 1, wherein said rotor comprises a single rotor concentrically arranged with respect to said stators.

10. The rotating asynchronous converter according to claim 1, wherein said converter further comprises an auxiliary device connected to said rotor for starting up the rotor to a suitable rotational speed before connection of said converter, and said rotor is rotatable with the frequency $$f_R = \frac{\pi - \alpha}{\pi} \cdot \frac{\Delta f}{4},$$

wherein $\Delta f = |f_1 - f_2|$.

* * * * *